(12) United States Patent
Akulavenkatavara et al.

(10) Patent No.: US 7,954,147 B2
(45) Date of Patent: May 31, 2011

(54) METHOD FOR SECURELY ENABLING DYNAMIC INSTRUMENTATION

(75) Inventors: Prasadarao Akulavenkatavara, Portland, OR (US); Gerritt Huizenga, Portland, OR (US); Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 894 days.

(21) Appl. No.: 11/853,281

(22) Filed: Sep. 11, 2007

(65) Prior Publication Data

US 2009/0070867 A1    Mar. 12, 2009

(51) Int. Cl.
| | |
|---|---|
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G06F 7/00 | (2006.01) |
| G11C 7/00 | (2006.01) |

(52) U.S. Cl. ........... 726/18; 726/16; 726/17; 726/19; 707/781; 707/782; 707/783; 707/784; 707/785

(58) Field of Classification Search ............ 726/21, 726/25, 16–19, 26–30; 714/25, 34, 35; 717/124, 717/128–130, 158; 707/781–785
See application file for complete search history.

(56) References Cited

U.S. PATENT DOCUMENTS

| | | | |
|---|---|---|---|
| 6,708,326 B1 * | 3/2004 | Bhattacarya | 717/124 |
| 6,918,110 B2 | 7/2005 | Hundt et al. | |
| 7,263,689 B1 * | 8/2007 | Edwards et al. | 717/127 |
| 2002/0152455 A1 | 10/2002 | Hundt et al. | |
| 2003/0106045 A1 * | 6/2003 | Arnold et al. | 717/129 |
| 2004/0068720 A1 | 4/2004 | Hundt et al. | |
| 2007/0180439 A1 * | 8/2007 | Sundararajan et al. | 717/158 |

* cited by examiner

Primary Examiner — Hosuk Song
Assistant Examiner — Randal D Moran
(74) Attorney, Agent, or Firm — Cantor Colburn LLP; Steven Bennett

(57) ABSTRACT

A method is provided for securely enabling dynamic instrumentation. The method includes categorizing probes, upon creation, into one or more classes, providing lists of permissions for activating the probes and associating users with the permissions for activating the probes, such that certain users have permissions for activating certain probes. Users are associated with permissions by mapping classes of probes to permissions and mapping users to permissions, mapping classes of users to probes, or mapping users to at least one of classes of probes and classes of capabilities.

3 Claims, 1 Drawing Sheet

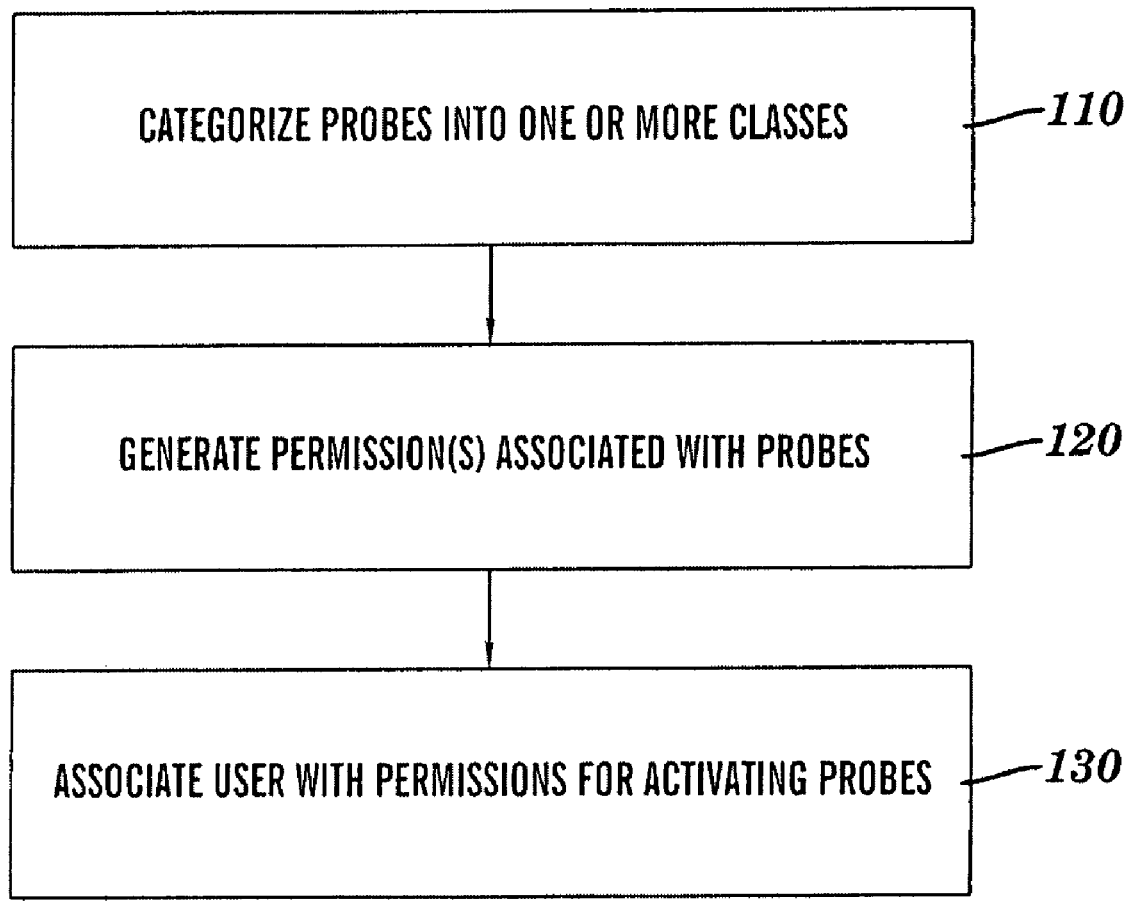
FIGURE

METHOD FOR SECURELY ENABLING DYNAMIC INSTRUMENTATION

BACKGROUND

The present invention relates generally to dynamic instrumentation, and, more particularly, to secure dynamic instrumentation.

Dynamic instrumentation refers to obtaining instrumentation data for an executable program (also referred to as an "executable application" or "application") while the program is executing without any pre-processing. An example of dynamic instrumentation is modification of the running image of an application. Such modification typically changes the instructions executed in such a way as to provide insight into the operation of the application without interfering with the correct operation of the application. Thus, the same executable program that is used in a production environment may be executed and instrumented post-production. The dynamic instrumentation is performed by creating instrumented versions of functions when the functions are invoked, and thereafter modifying existing instructions, adding instrumentation, and then executing the original instructions.

Linux supports dynamic instrumentation, as with kernel dynamic probes (kprobes). Kprobes provide a lightweight interface for kernel modules to implant probes and register corresponding probe handlers. A probe is an automated breakpoint that may be implanted dynamically in executing kernel-space code, including modules loaded into the kernel space, without having to modify the underlying source.

Probes are intended to be used as ad hoc service aids where minimal disruption to the system is required. They are particularly advantageous in production environments where the use of interactive debuggers is undesirable. Kprobes also have substantial applicability in test and development environments.

With each probe, a corresponding probe event handler address is specified. Probe event handlers run as extensions to the system breakpoint interrupt handler and are expected to have little or no dependence on system facilities. Because of this design, probes are able to be implanted in the most hostile environments without adversely impacting system performance.

Currently, dynamic instrumentation in Linux requires root privileges. Most system administrators prefer to limit access to escalated privileges so that system security is not compromised. However, enabling more users to use safe system dynamic instrumentation operations without the highest privilege levels would allow more users on the system to utilize the debugging tools of dynamic instrumentation.

Thus, there exists a need for enabling secure dynamic instrumentation without granting root privileges.

SUMMARY

According to exemplary embodiments, a method is provided for securely enabling dynamic instrumentation. The method includes categorizing probes, upon creation, into one or more classes, providing lists of permissions for activating the probes and associating users with the permissions for activating the probes, such that certain users have permissions for activating certain probes. Users are associated with permissions by mapping classes of probes to permissions and mapping users to permissions, mapping classes of users to probes, or mapping users to at least one of classes of probes and classes of capabilities. Probe permission classes may be defined by the creator of the dynamic instrumentation module.

BRIEF DESCRIPTION OF THE DRAWING

FIG. 1 illustrates a method for enabling secure dynamic instrumentation according to a exemplary embodiment.

DETAILED DESCRIPTION

According to an exemplary embodiment, when dynamic instrumentation is built into a system, an authentication profile of the users who are allowed to use the instrumentation is specified. A separate application programming interface (API) may be provided to activate the instrumentation that can be executed by any user, but only authorized users are allowed to activate the instrumentation. In the past, only a "super user" could activate any and all the probes. This limited the class of users who could use the dynamic instrumentation technology.

According to exemplary embodiments, the permitted users are broken into several classes, and capabilities are given to various classes of users appropriate for the classes. For example, a class of probes may be created for studying a database server, and permission can be granted to the administrator of the database who is not a super user to activate that class of probes. Probe permission classes may be defined by the creator of the dynamic instrumentation module.

According to an exemplary embodiment, when a probe is created, it is categorized into one or more classes. This is shown as step 110 in FIG. 1, which illustrates an exemplary method for enabling secure dynamic instrumentation. Some examples of probe classes include: process or scheduler, database, web server, etc. Each probe may have a list of permissions associated with it that are required to activate that probe. This list is provided or generated at step 120 by a creator of the dynamic instrumentation probe. A permission may include, but not be limited to, a user id, a group id, a process group, capabilities, etc. Users of the system may be associated with permissions and/or capabilities for activating the probes. This association occurs at step 130. The steps of categorizing probes, generating permissions, and associating users with permissions are performed for each newly created probe.

This method ensures that a user has compatible permissions and capabilities to activate a probe or class of probes as appropriate for that user. This can be implemented in several ways by using a set of tables or matrixes. For example, one set of tables may map probes to capabilities be based on user id, where an owner of a process can activate any probes meant for that application. An example of such a mapping in shown in Table 1 below.

TABLE 1

| | |
|---|---|
| DB2 process owner id (e.g., 100) | All the probes in DB2 process |
| Websphere process owner id (e.g., 138) | All the probes in Websphere process |
| Oracle process owner id (e.g., 221) | All the probes in Oracles process |
| Domino process owner id (e.g., 980) | All the probes in Domino process |

Another type of mapping may be used to allow users with certain capabilities in their profiles to activate a class of probes identified by a tag, as illustrated in the table below.

TABLE 2

| Users with CAP_IPC_OWNER capability | All the probes tagged IPC |
|---|---|
| Users with CAP_AUDIT_CONTROL capability | All the probes tagged AUDIT |

Another type of mapping may be used to activate a set of probes based on membership to a group. An example of such a table is shown below.

TABLE 3

| Network administrator group | All the probes tagged NET* |
|---|---|
| Backup administrator group | All the probes tagged BACKUP* |
| System administrator group | All the probes in the system except those have tag AUDIT in them. |
| Ecommerce administrator group | All the probes in Websphere, DB2, Oracle and Apache processes |

Of course, it should be appreciated that these tables are given by way of example only. Any technique for associating users with permissions and capabilities for activating probes or classes of probes may be used.

The processes described above may be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. When implemented on a general-purpose microprocessor, the computer program code segments may configure the microprocessor to create specific logic circuits.

While exemplary embodiments have been described above, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for securely enabling dynamic instrumentation in a dynamic instrumentation module within a computer, comprising:
   wherein the method is executed on a computer using a general purpose microprocessor;
   categorizing probes, upon creation, into one or more classes;
   providing lists of permissions for activating the probes; and
   associating users with the permissions for activating the probes, such that certain users have permissions for activating certain probes;
   wherein users are associated with the permissions by mapping classes of probes to the permissions and mapping users to the permissions;
   wherein the users are associated with the permissions by mapping classes of users to probes;
   wherein the steps of categorizing probes, providing list of permissions, and associating users with the permissions are performed for each newly created probe;
   wherein the permissions include user id permissions, group id permissions, process group permissions, and capabilities permissions;
   wherein the classes of probes include a process class, a scheduler class, and a database class; and
   wherein the classes of probes are not for a super user who operates all probes.

2. The method of claim 1, wherein the classes includes a web server class.

3. The method of claim 1, wherein the probes are categorized into classes defined by a creator of the dynamic instrumentation module.

* * * * *